(12) United States Patent
Deiss et al.

(10) Patent No.: US 11,066,518 B2
(45) Date of Patent: Jul. 20, 2021

(54) METHOD AND DEVICE FOR THE PRODUCTION OF POLYAMIDE 6 WITH LOW EXTRACT CONTENT

(71) Applicant: Technip Zimmer GmbH, Frankfurt (DE)

(72) Inventors: Stefan Deiss, Frankfurt (DE); Raimund Schwarz, Frankfurt (DE); Martin Baumert, Frankfurt (DE); Gerald Kriesche, Frankfurt (DE); Maurice Koch, Frankfurt (DE)

(73) Assignee: Technip Zimmer GmbH

( * ) Notice: Subject to any disclaimer, the term of this patent is extended or adjusted under 35 U.S.C. 154(b) by 0 days.

(21) Appl. No.: 16/140,667

(22) Filed: Sep. 25, 2018

(65) Prior Publication Data

US 2020/0071463 A1 Mar. 5, 2020

(30) Foreign Application Priority Data

Aug. 28, 2018 (DE) .......................... 102018120988.6

(51) Int. Cl.
*C08G 69/46* (2006.01)
*B29C 48/76* (2019.01)
(Continued)

(52) U.S. Cl.
CPC ........... *C08G 69/46* (2013.01); *B01D 5/0027* (2013.01); *B01D 5/0069* (2013.01);
(Continued)

(58) Field of Classification Search
CPC ........ C08G 69/46; C08G 69/28; C08G 69/16; B29K 2077/10; B29K 2313/00;
(Continued)

(56) References Cited

U.S. PATENT DOCUMENTS 3,371,059 A * 2/1968 Rich ..................... B01D 19/02
523/300
3,704,100 A 11/1972 Twilley et al.
(Continued)

FOREIGN PATENT DOCUMENTS

DE 2821686 A1 11/1979
DE 2948865 A1 6/1980
(Continued)

OTHER PUBLICATIONS

"A washable porous metal HEPA filter", Sekellick et al., Proceedings of the National Energy Technology Laboratory, 2000 (Year: 2000).*

(Continued)

*Primary Examiner* — Matthew J Daniels
*Assistant Examiner* — Yunju Kim
(74) *Attorney, Agent, or Firm* — Emerson, Thomson & Bennett, LLC; Roger D. Emerson; Peter R. Detorre

(57) ABSTRACT

The present invention relates to a method for the production of polyamide 6 with low extract content and a device for it. Here, a melt of non-extracted polyamide 6 is cleaned from monomer and oligomers in a degasification device in vacuum, wherein the vapor being withdrawn from the degasification device by the vacuum generation device is cleaned from monomer, oligomers and optionally water at first in a direct condenser which is operated with liquid ε-caprolactam and subsequently in a pre-separator which is cooled with a coolant, before it reaches the vacuum generation device. A particularly preferable variant of the method envisages the usage of the melt of polyamide 6 with low extract content so prepared in a direct process of spinning into textile fibers and/or filaments.

11 Claims, 1 Drawing Sheet

(51) Int. Cl.
*B29C 48/68* (2019.01)
*B01D 5/00* (2006.01)
*B01D 7/00* (2006.01)
*B01D 19/00* (2006.01)
*C08L 77/02* (2006.01)
*B29K 77/00* (2006.01)

(52) U.S. Cl.
CPC ............ *B01D 5/0084* (2013.01); *B01D 7/00* (2013.01); *B01D 19/0005* (2013.01); *B29C 48/682* (2019.02); *B29C 48/762* (2019.02); *B29K 2077/10* (2013.01); *B29K 2313/00* (2013.01); *C08L 77/02* (2013.01)

(58) Field of Classification Search
CPC ..... C08L 77/02; B01D 5/0027; B01D 5/0069; B01D 5/0084; B01D 7/00; B29C 47/38; B29C 47/42; B29C 47/766; B29C 47/662
USPC ........................... 264/102; 528/272; 422/135
See application file for complete search history.

(56) References Cited

U.S. PATENT DOCUMENTS

| | | | | |
|---|---|---|---|---|
| 3,705,617 | A | * 12/1972 | Miller | B01D 7/02 165/179 |
| 4,327,208 | A | 4/1982 | Lehr et al. | |
| 4,540,774 | A | 9/1985 | Gerking et al. | |
| 4,734,263 | A | * 3/1988 | Gerking | C08G 69/16 422/135 |
| 5,169,582 | A | 12/1992 | Illing | |
| 5,476,319 | A | 12/1995 | Blach | |
| 5,836,682 | A | 11/1998 | Blach | |
| 6,136,947 | A | 10/2000 | Wiltzer et al. | |
| 8,541,540 | B2 | 9/2013 | Kirsten et al. | |
| 10,092,854 | B2 | * 10/2018 | Kaper | B01D 1/14 |
| 2003/0176625 | A1 | 9/2003 | Morhenn et al. | |
| 2004/0049005 | A1 | * 3/2004 | Gahr | C08G 69/16 528/314 |
| 2005/0047267 | A1 | 3/2005 | Gneuss et al. | |
| 2017/0320010 | A1 | * 11/2017 | Eisch | B29C 47/0083 |

FOREIGN PATENT DOCUMENTS

| | | |
|---|---|---|
| DE | 0137884 A1 | 8/1988 |
| DE | 4231232 | 8/1993 |
| DE | 4231232 C1 | 8/1993 |
| DE | 4413965 A1 | 12/1994 |
| DE | 195 46 417 B4 | 6/1997 |
| DE | 19546417 | 6/1997 |
| DE | 19604228 C1 | 9/1997 |
| DE | 19844176 C1 | 3/2000 |
| DE | 10 047 657 A1 | 4/2002 |
| DE | 10150627 A1 | 5/2003 |
| DE | 102018120988 | 1/2019 |
| EP | 0137884 | 4/1985 |
| EP | 0 204 123 A1 | 12/1986 |
| EP | 0204123 | 12/1986 |
| EP | 0 137 884 B1 | 8/1988 |
| EP | 2746313 A1 | 12/2012 |
| GB | 711 956 A | 7/1954 |
| GB | 711956 | 7/1954 |
| GB | 1 208 476 A | 10/1970 |
| GB | 1208476 | 10/1970 |
| WO | 0174925 A1 | 10/2001 |

OTHER PUBLICATIONS

"How does a spray condenser work?", https://chemical-engg.com/blogs/entry/12-how-does-a-spray-condenser-work/, 2016 (Year: 2016).*
Office Action for corresponding German Patent Application No. 10 2018 120 988.6 dated Oct. 11, 2018 and Amendment to the Description for Grant (translated).
Decision to Grant corresponding German Patent Application No. 10 2018 120 988.6 dated Nov. 8, 2018.
Wikipedia: "Cold trap", Jan. 14, 2018 (Jan. 14, 2018), pp. 1-3, XP002788994, Retrieved from the Internet: URL: https://en.wikipedia.org/wiki/Cold_trap.
International Search Report and Written Opinion for PCT App. No. PCT/EP2018/077211 dated Mar. 18, 2019.
G. Illing et al. "Energiesparendes Herstellen von PA 6 durch direkte Polymerisation", Kunststoffe, Sonderdruck Oct. 1989.

* cited by examiner

METHOD AND DEVICE FOR THE PRODUCTION OF POLYAMIDE 6 WITH LOW EXTRACT CONTENT

The present invention relates to a method for the production of polyamide 6 with low extract content and a device for it. Here, a melt of non-extracted polyamide 6 is cleaned from monomer and oligomers in a degasification device in vacuum, wherein the vapor being withdrawn from the degasification device by the vacuum generation device is cleaned from monomer, oligomers and optionally water at first in a direct condenser which is operated with liquid ε-caprolactam and subsequently in a pre-separator which is cooled with a coolant, before it reaches the vacuum generation device. A particularly preferable variant of the method envisages the use of the melt of polyamide 6 with low extract content so prepared in a direct process of spinning into textile fibers and/or filaments.

PRIOR ART

The method which is mostly used in the large-scale industrial production of polyamide 6 (PA 6) is the ring-opening polymerization of ε-caprolactam in the melt with the addition of water. Here, after a sufficient reaction time an equilibrium state is reached in which the PA 6 melt contains around 10% by weight of ε-caprolactam. Besides the monomer also appreciable portions of the cyclic dimer as well as the trimer, tetramer, pentamer and hexamer can be found. Depending on the reaction conditions, the content may vary within the range of 7-14% by weight. Before the further processing, they have to be removed, because they deteriorate the polymer properties so dramatically that, for example, a spinning into fibers is not possible at all.

Since many years for that due to cost reasons a method for vacuum extraction has been sought which might be the basis for a direct PA 6 process. In such a direct method the melt would directly be fed into e.g. a spinnery or another further processing such as a foil production, without solidification and granulation as intermediate steps. Equivalent methods are known from the production of polyester.

But with the vacuum extraction methods which till today have been described in prior art it was not possible to achieve the required qualities inclusive the constancy and inclusive a low vulnerability of such a method. In particular, often blockages directly in the waste-gas line occur which result in laborious cleaning operations and thus process interruptions. This results in the fact that till today in the production virtually exclusively wet extraction processes have been used. For that, at first, the polymerized PA 6 melt is processed into granules which then are extracted with water in extraction processes of several hours. From the large amounts of extract water resulting from these processes the ε-caprolactam has to be recovered in a laborious manner by evaporation. Therefore, in particular, major manufacturers which virtually exclusively produce textile end products are especially interested in direct processes, when they result in a perfect and salable end product which can be produced in a more economic manner.

DE 28 21 686 A1 describes a method with which e.g. by means of a thin layer or screw vaporizer relatively thin layers are created. To the vaporizers a vacuum of 0.4-6.5 mbar is applied and the outgassing extract is precipitated in a lactam mist. According to DE 28 21 686 A1 monomer contents of about 0.2% to 0.3% are achieved. Residence times in the apparatuses are not mentioned.

However, in the production scale the tower-shaped devices of the thin layer vaporizers used are very large and they are under a high vacuum of about 1 mbar. In this connection the risk of a leakage increases strongly. Furthermore, the apparatuses are associated with high acquisition and operational costs as well as high complexity. Dead spaces result in a serious back-formation of extract from PA 6 which, in particular in the case of plant sizes in the production scale, is very problematic.

Undesired ingress of oxygen which must be feared all the time results in impairment of the polyamide and normally renders the product useless. In the first instance here discolorations emerge which already occur at very low amounts of oxygen. However, in the case of higher concentrations of oxygen this also still results in stronger impairments of the polymer by chain degradation which are connected with embrittlements and worsening of the mechanical characteristic values. For locating and removing such a leakage, in the worst case the complete production has to be stopped. The process of restarting of a large plant subsequently produces a considerable portion of transition and/or scrap material, not to mention the previous stoppage in production during the repair time.

Furthermore, merely due to the size, the costs for the operation and the investment, the space requirements and the complexity, only a central usage in a direct PA 6 process is reasonable. With increasing length of a conveyor line and/or the residence time of the PA 6 melt it is increasingly seriously impaired and/or becomes increasingly more useless for the further processing. Since the extracted PA 6 is in a disequilibrated state and it is strongly keen on going toward its equilibrium distribution, the residence time of the extracted PA 6 melt has to be kept as short as possible. Already few minutes of residence time at normal processing temperatures may again increase the extract content by about 2%. So it would no longer be possible to use the product for the further processing.

The last one is also one of the reasons, why the PA 6 spinning process till today preferably has been conducted in a granules extrusion mode of operation with numerous single-screw extruders and no direct spinning process has been established up to now. The central use results in long melt residence times. The use of several vaporizer towers or reactors, such as for example is proposed in EP 0 137 884 A1, thus, due to financial reasons, cannot be realized in view of the complexity and the costs. Apart from this, in EP 0 137 884 A1 also only poor extract values are achieved. Here, the benchmark which has to be achieved with respect to the costs as well as also with respect to the obtained extract values is always the conventional production process involving wet extraction.

Accordingly, normally the classic extrusion mode of operation with several production lines after the polymerization of PA 6 by means of single-screw melt extruders seems to be suitable for processing wet-extracted granules in a PA 6 spinnery with a low melt residence time into textile threads such as partially oriented yarn (POY), fully drawn yarn (FDY), bulk continuous filament (BCF) or staple fibers (SF). Till today, this mode of operation has been the normal one and by far dominating.

On the contrary, the screw vaporizers which are mentioned as an alternative, particularly the twin-screw extruder which is mentioned in the examples, have lower volume requirements, but however they also do not result in a sufficient surface renewal, thin layers and hence vaporization surface. So the required extract values can only be achieved with an extended residence time in a larger extruder which then stresses the polyamide thermally and also mechanically, or they even cannot be achieved at all. Furthermore, normally, in the case of large twin-screw extruders the clearances are higher which then in turn can result in thicker layers. As a result thereof, it is even possible that the degasification performance decreases (Fick's law), instead of increasing performance so that the large twin-screw extruders are not of advantage, but rather basically of disadvantage. On the other hand, also an extended residence time, in particular in the case of not extremely thin layers is disadvantageous. Consequently, the obtained throughputs are far too low for resulting in a practice-oriented economic production process.

Thus, the method disclosed in DE 28 21 686 A1 is not applicable and/or suitable in particular for a direct spinning process in large production plants with their numerous split streams, such as is common in the field of polyesters.

The same deficiencies also pertain to WO 01/74925 A1 which describes a vacuum extraction process in which a two-stage loop and/or tube vaporizer is used. Prior to the second stage, preferably water vapor, but also nitrogen are injected as entraining agents directly before a static melt mixer for forming bubbles in the subsequent vaporization aggregate of the second extraction stage. This known effect accelerates the evaporation of the extracts.

For the method described in WO 01/74925 A1 and for the respective device the same is true as has been described for DE 28 21 686 A1, but with the difference that this device occupies still more space than the apparatus disclosed in DE 28 21 686 A1. Furthermore, a method such as disclosed in WO 01/74925 A1 is connected with the additional disadvantage that the product quality and the process stability strongly depend on the absolute size and constancy of the bubble sizes and/or their distribution. In the case of such a method with rigid elements it is normal that the bubble sizes suffer from local and temporal inhomogeneities which unavoidably results in respective inhomogeneities in the product. A stable operation of such a method is difficult. This is also the reason, why besides nitrogen instead of water water vapor is used, which emphasizes the sensitivity of the method with respect to process inhomogeneity, which is also mentioned in the text.

The jets used for the generation of vacuum are operated with vaporous ε-caprolactam. The vaporous ε-caprolactam has a temperature of 300° C. So, in addition, this is connected with the high risk to impair the basic unit of the PA 6, the ε-caprolactam. Finally, this ε-caprolactam is still returned into the polymerization via a refeed system. But the last one is problematic, since only slightly impaired PA 6 may cause problems in the downstream spinnery or the subsequent processes. For example, an uneven dying in the textile and/or a reduced spinnery yield is possible.

Object

It was the object of the present invention to provide a novel method and a novel device which are not characterized by the above-described prior art disadvantages. In particular, it was the aim that the method results in applicable, low extract values which also allow the usage in a direct method, while still maintaining the miscellaneous polymer quality. At the same time, it was the aim to guarantee a higher cost effectiveness in comparison to the wet extraction process.

DESCRIPTION OF THE INVENTION

The object is solved by the method according to the present invention and the device according to the present invention.

According to the present invention is a method for the production of polyamide 6 with low extract content, comprising the steps of
a) providing a melt of non-extracted polyamide 6;
b) feeding the melt into a degasification device which is connected with a vacuum generation device;
c) extraction of ε-caprolactam and oligomers from the melt in vacuum;
d) feeding the extracted polyamide 6 melt from the degasification device into a further processing,
wherein
the vacuum generation device comprises an upstream pre-separator which is cooled with coolant,
between the degasification device and the pre-separator a direct condenser is arranged, and
the direct condenser is operated with liquid ε-caprolactam which is circulated, wherein for maintaining a constant circulation amount continuously an amount of ε-caprolactam which corresponds to the condensed extract amount is removed.

Surprisingly, it has been shown that contrary to the prior art disclosure up to now, with the method according to the present invention extract values are achieved which also facilitate a direct PA 6 process.

In the sense of the invention a "polyamide 6 with low extract content" is a polyamide 6 which is poor in portions which can be extracted with water. In particular, their content is so low that the polyamide 6 is suitable for a further processing.

The method according to the present invention consists of a relatively small degasification device which rolls out the fed non-extracted PA 6 melt into very thin films, guarantees a strong surface exchange and homogenizes very well. Here, the source of the melt is either preferably directly the polymerization or granules which have been melted in an extruder again and which have not at all been subjected to an extraction. Normally, the temperature range is 260° C. to 285° C. In this degasification device from the untreated melt the ε-caprolactam as well as the oligomers are removed in vacuum. Here, the pressure is preferably <2 mbar abs., particularly preferably <1 mbar abs.

Between the degasification device and the vacuum generation device a direct condenser, followed by a pre-separator which is cooled with coolant is arranged. The direct condenser which is occasionally also denoted as injection condenser, liquid vacuum washer or spray condenser is operated with liquid ε-caprolactam which is circulated. In this manner, the ε-caprolactam and the oligomers from the vapor of the degasification device are condensed without contamination. The amount of the condensate can continuously be removed from the circulation and can directly be fed into the polymerization process. So, already a major part of the vapor is separated. From the direct condenser a gas stream exits into the direction of the vacuum generation device which still contains only low residual amounts of ε-caprolactam and optionally water which here under the operating conditions is not separated. These residual constituents in the gas stream are then separated in the pre-separator which is cooled with coolant so that no impurities reach the vacuum generation device.

The pre-separator which is cooled with coolant, in addition, results in the fact that the withdrawn gas stream undergoes a considerable volume contraction which makes it possible to subsequently use vacuum pumps which are essentially smaller and/or which at all only allows a process which can be used in economically working large production plants in a reasonable manner with respect to energy as well as space requirements. Thus, here, in addition to the mere pump protection effect an additional effect arises.

In an advantageous design variant of the method the pre-separator has a two-stage design consisting of a sublimator and a downstream regenerative high performance metal filter. This particularly strong cooling variant (e.g. to 0° C. down to −30° C.), on the one hand, increases the volume contraction effect and, on the other hand, results in a highly effective separation. Solid particles which are still entrained in the gas stream here are separated in the subsequent high performance metal filter.

Preferably, the pre-separator is present twice and is alternately operated in the separation and cleaning mode. So a continuous operation of the plant is guaranteed. While the one pre-separator is used for separation, in the second pre-separator a cleaning of the cooling element and optionally a regeneration of the high performance metal filter can be conducted.

In a possible design variant of the method the further processing consists of an optional addition of additives to the melt and a granulation. In a highly preferable design variant the further processing consists of an optional addition of additives to the melt and a direct process of spinning into textile fibers and/or filaments, the foil extrusion or the production of molded bodies. In both variants the addition of additives may also already be conducted in the degasification device. Thus, in this design variant the method is characterized by the advantage that besides the effective extraction under vacuum in addition substances, e.g. masterbatch, other additives or other aggregates or modifiers can be dispersed. The last one increases the economic efficiency and the flexibility of the production process of PA 6 once more, because now depending on the commercial demand, contrary to the mode of operation with for example one addition of additives—in particular an addition of $TiO_2$—in the polymerization for each vacuum-extracted split stream different $TiO_2$ or other contents can be adjusted.

Via the direct process PA 6 directly from the polymerization can be processed into spinning threads. Here, with respect to quality the requirements for conventionally prepared spinning threads are fulfilled. In particular, this is so remarkable due to the fact, since the method according to the present invention in this highly preferable design variant works considerably more economical than the conventional, multi-stage wet extraction method with subsequent spinning via separate melting in spinning extruders.

In a preferable design variant of the method it is envisaged that one or more entraining agents are mixed into the melt in the degasification device. So an improved extraction process can be achieved. Especially in the case of a combination of different entraining agents the extraction result with respect to the particularly troublesome cyclic dimers can be optimized once again.

The entraining agents which are preferably used here are water, water vapor, ε-caprolactam, nitrogen, $CO_2$ or a noble gas. Particularly preferable are water vapor and ε-caprolactam. It is highly preferable, when water vapor and ε-caprolactam are used together. Especially in the case of this combination it has surprisingly been shown that the classic expectation that the extraction result with the use of additional ε-caprolactam in total should worsen is not true, and that in combination with the water vapor the residual content of cyclic dimers can be further reduced once again.

Preferably, as a degasification device a multi-screw degasification aggregate or a thin film vaporizer is used. It is particularly preferable, when the multi-screw degasification aggregate consists of a multi-screw extruder, an extruder with more than two screws, a ring extruder or a multi-rotation extruder. Examples for such extruders are inter alia disclosed in DE 42 31 232 C1, DE 44 13 965 A1, DE 196 04 228 C1 or DE 101 50 627 A1. Contrary to the concerns which are mentioned in the above-mentioned WO 01/74925 A1 with respect to the use of multi-screw extruders due to the extraction results which are insufficient for the high requirements with respect to the extract contents and in particular the dimer content in the case of technical polyamide raw materials, with these extruders in the method according to the present invention it was able to achieve an excellent extraction result which also allows the usage in a direct process.

The multi-screw extruders are in particular characterized by the fact that they result in a very good mixing of the melt and thus surface renewal and that they are capable of generating extremely thin layers. In these respects they are much better than the thin film vaporizers, because they are not able neither to achieve such an effective mixing nor to readily reduce the layer thickness far enough. The last one is limited by the viscosity of the polymer and can be compensated only by higher temperatures. Accordingly, the incipient thermal impairment limits the possibilities with respect to the reduction of the layer thicknesses.

In an advantageous design variant of the method to the polyamide 6 melt after step a) and/or c) isocyanic acid, urea, biuret, cyanuric acid and/or oligomeric or polymeric homologues of urea are mixed. The isocyanic acid which can either be used directly as an additive or in the form of the additionally mentioned compounds from which it can be released by heat exposure, functions as an end-capper for the molecule chains and so results in a strong reduction of the extract portion. With the polymer modification also the extract back-formation is strongly reduced. In the method according to the present invention the addition can be conducted either directly into the still untreated melt or after the extraction. Also an addition at both positions is possible.

Especially with respect to the suitability for a direct process the effect of the reduced extract back-formation is highly advantageous, because so longer residence times in, for example, the spinning extruders for the fiber production become possible. So the low extract values of the melt which are achieved with the method according to the present invention can be maintained longer which facilitates a spinning process which is common in prior art.

In a particularly preferable design variant of the method in which the extracted polyamide 6 melt is spun in a direct process into textile fibers and/or filaments, the fibers and/or filaments contain extractable portions in amounts of ≤0.85% by weight, preferably ≤0.75% by weight, particularly preferably ≤0.65% by weight.

In a further particularly preferable design variant of the method in which the extracted polyamide 6 melt is spun in a direct process into textile fibers and/or filaments, the fibers and/or filaments contain extractable portions in amounts of ≤0.24% by weight of monomer, ≤0.20% by weight of cyclic dimer, ≤0.21% by weight of trimer, ≤0.12% by weight of tetramer, ≤0.04% by weight of pentamer and ≤0.03% by weight of hexamer.

In a still further particularly preferable design variant of the method in which the extracted polyamide 6 melt is spun in a direct process into textile fibers and/or filaments, the fibers and/or filaments have a relative standard deviation of the strain at break of <4% and/or a relative standard deviation of the tear resistance of <3% and/or a relative standard deviation of the titer of <0.45%.

Furthermore, according to the present invention is a device for the production of polyamide 6 with low extract content, comprising
- a degasification device with a feed line for a melt of non-extracted polyamide 6, a connection to a vacuum generation device and a discharge line for the extracted polyamide 6 melt to a further processing,
- a direct condenser which is arranged downstream to the degasification device in the connection to the vacuum generation device and is designed for operating with liquid ε-caprolactam,
- a circulation for liquid ε-caprolactam being connected with the direct condenser with conveying means, optional tempering means and means for continuously removing an amount of ε-caprolactam for maintaining a constant circulation amount,
- a vacuum generation device which is arranged downstream with respect to the direct condenser and which is provided with an upstream pre-separator which is cooled with coolant.

Preferably, the degasification device comprises means for mixing an entraining agent into the melt. Depending on the kind of the entraining agent used, they may be a gas feed, a solid metering or a liquid feed with respective pumps or extruders. Depending on the metering site and the design of the degasification device, the means optionally also comprise required mixing devices which distribute the entraining agent in the melt.

It is highly preferable, when the pre-separator has a two-stage design consisting of a sublimator and a downstream regenerative high performance metal filter.

Furthermore, preferably, the pre-separator is present twice and is configured for an alternate separation and cleaning operation. This, in particular, also comprises means for automatically switching the pre-separators between both operating states.

Preferably, the degasification device consists of a multi-screw degasification aggregate or a thin film vaporizer. It is especially preferable, when the multi-screw degasification aggregate consists of a multi-screw extruder, an extruder with more than two screws, a ring extruder or a multi-rotation extruder.

DESCRIPTION OF THE FIGURES

In the following, the invention is described by means of exemplary figures. They are provided only for illustrating the invention, and they should not be construed as limiting.

Figure 1:
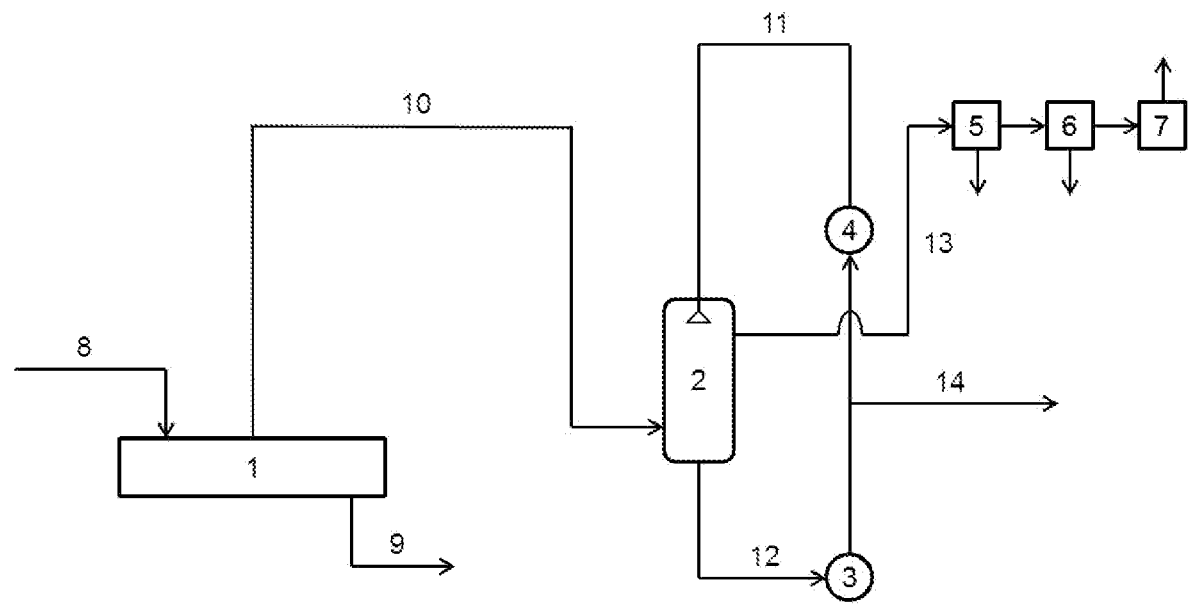
FIG. 1 is a schematic drawing of a plant according to the present invention.

In FIG. 1 a schematic drawing of an example of a plant according to the present invention is shown.

In this example the degasification device (1) consists of an extruder which has the design of a multi-screw extruder. Here it is especially preferable, when the ring extruder of the company Extricom with the name RE or the multi-screw or multi-rotation extruder of the company Gneuß with the name MRS is used.

The untreated polyamide 6 melt (8) originating from the polymerization is continuously fed into the degasification device (1). Normally, the temperature range is 260° C. to 285° C. Not shown in the drawing is a feed of water vapor into the extruder which is used as an entraining agent. Continuously, the vapor (10) consisting of monomer and oligomer vapors and water is withdrawn from the extruder. The vacuum which is necessary for that is generated by the vacuum pump stand (7). The extracted polyamide 6 melt (9) is then guided from the degasification device (1) to a further processing which is not shown. This may be a granulation, a metering of aggregates and/or a direct spinnery.

The vapor (10) withdrawn from the degasification device (1) is at first guided into the lower part of the direct condenser (2). This one is provided from above by a circulation pump (3) in a countercurrent flow with respect to the vapor (10) with liquid ε-caprolactam (11) which forms a free fall film and/or a spray mist for the condensation and is circulated. Under these conditions the water is not separated. From the lower part of the direct condenser (2) the liquid ε-caprolactam together with condensed low-molecular substances (12) is pumped off by the circulation pump (3). Here, the circulation stream is heated by the withdrawn vapor (10). For maintaining a constant temperature of 80-90° C., preferably 85° C., in the circulation a heat exchanger (4) is provided.

The excess of ε-caprolactam which results from the condensation is removed after the circulation pump (3) at the ε-caprolactam overflow (14). This overflow stream can be used in the recovery or directly in the polymerization again.

At its upper side the direct condenser (2) is connected with the vacuum pump stand (7) via the sublimator (5) and the high performance metal filter (6). The constituents (13) which are not condensable at the present process conditions, such as for example the water, which still leave the direct condenser (2) are separated in the sublimator (5) and the high performance metal filter (6) being arranged upstream with respect to the vacuum pump stand (7).

The separation is conducted in two stages. Both, humidity and also residual monomers can physically be separated in a first stage in the sublimator (5). Residual dusts and fine particles are separated in the second stage in the regenerative high performance metal filter (6) so that at the vacuum pump stand (7) only a pure gas, but no liquid or solid particles arrive. This pre-separator has the design of a parallel-arranged double separator (not shown in the drawing). While one sublimator (5) is cleaned, the second sublimator works in the separation mode. Subsequently, it is changed again. The switching works automatically. Therefore, the process is a continuous process. Then, from the vacuum pump stand (7) only the exhaust gas exits.

It has been shown that the novel method results in extract values which allow a direct process without using an extremely large and vulnerable construction. Furthermore, it can also be used in the case of plant sizes with throughputs of e.g. 130 t/day. This is in particular achieved by the vacuum pump and separation system used which surprisingly results in this direct process in the at the first time used combination with the modern multi-screw extrusion technique with non-extracted polyamide 6 in the very good extract values and in high cost efficiency. Furthermore, it is possible to use standard equipment.

Figure 2:
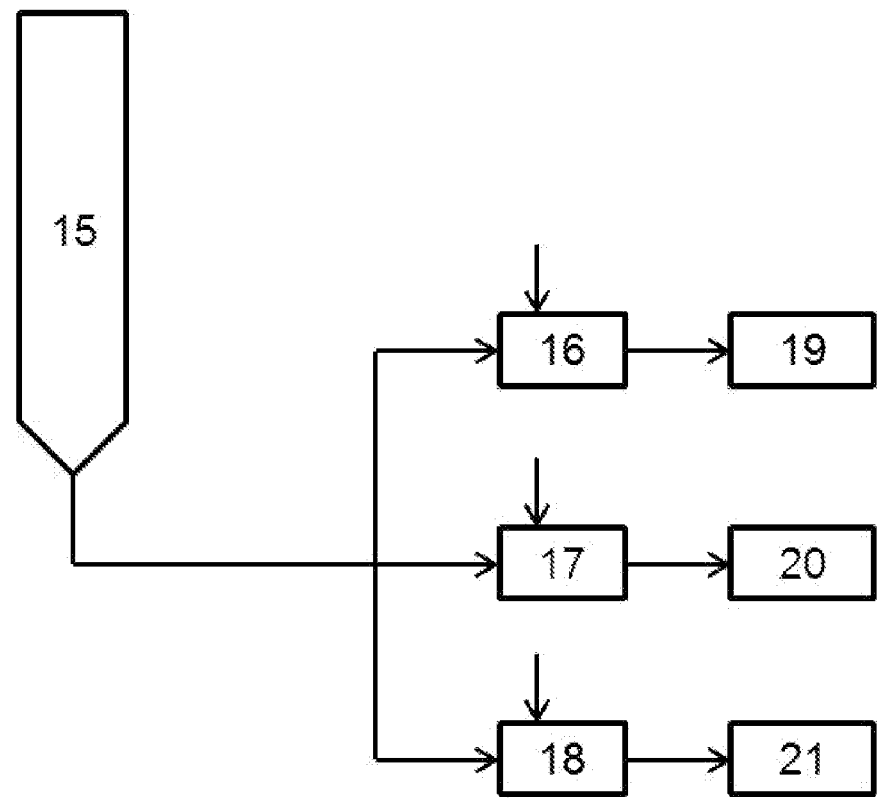
FIG. 2 is a schematic drawing of a direct process with spinning into fibers.

In FIG. 2 a schematic drawing of a direct process with spinning into fibers is shown.

From the last container of the polymerization process, the VK tube (15), via a melt pump discharged polyamide 6 melt is at first transported via a main melt line to a first melt line branching and is there distributed into several further melt lines. In the course of the melt transport through the melt lines which are normally still further branched until finally they reach the respective spinning site (19-21) the melt passes a degasification apparatus (16-18) each, such as is shown in FIG. 1. Via the multi-screw degasification extruder, furthermore, it is possible to intermingle and homogenize additives for spinning purposes which are still added at the respective degasification extruder (shown in the drawing with the additional arrows towards the degasification apparatuses (16-18)). For example, in the three branches shown different degrees of dulling each of the produced yarns can be achieved by intermingling different amounts of $TiO_2$ in the degasification apparatuses (16-18). In addition, here also e.g. urea can be mixed in as an end-capper for facilitating longer residence times in the subsequent pipes and spinning sites without back-formation of extract.

A central vacuum extraction directly after the VK tube (15) up to the first branch cannot be used in the case of common large plants with e.g. 100 to 200 t/day, since the vacuum-extracted product during the melt transport up to the finished spinning product, starting with a moderate portion of residual extract at the exit of the central degasification extruder, again very fast forms extract so that the acceptable threshold at the spun yarn is exceeded very quickly.

For the production of so-called 'engineering plastics', however, a single central degasification unit, depending on the plant size, may be sufficient, because there in the standard methods with separate injection molding machine the residence times up to the final product are very short. Line branches and residence times in an extent such as is common in spinning processes, starting from the last reactor, e.g. for the mass-produced good PET-POY, do not exist there. Furthermore, the requirements with respect to the extract content of, for example, the final product 'engineering plastics' are normally considerably lower (e.g. 1.5% by weight).

EXAMPLES

For a comparison of the extract values and the most important parameters of a produced thread as comparison examples in the standard process with wet extraction and spinning conventionally via spinning extruders threads were produced. The same untreated starting granules were used for a method according to the present invention as simulated direct process, i.e. they were melted in an extruder and then this melt was supplied to the vacuum extraction. For being able to determine the extract content of the extracted melt, after the vacuum extraction at first granules were produced and tested. The granules so produced were then fed into the spinning extruder like in the case of the comparison examples. The production of the threads was conducted at two different temperatures each (ca. 270° C. and ca. 280° C. spinneret temperature at the spinning extruder). In addition, in both example series different entraining agents (water and water/ε-caprolactam) were used.

In all trials a partially oriented yarn (POY) with a nominal titer of 110 dtex/34 with a stretch ratio of ca. 1.3 for the texturing was produced. The spinning extruder was a 45 mm, 24D extruder of the company Oerlikon Barmag with a throughput of melt of 23.8 kg/h. So the total residence time of the melt which was measured by means of pulse input from the extruder via the pipe and the spinning beam with spinpack up to the finished thread was about 20 min. The temperature was measured with a measuring element directly in the melt, when it exits the spinneret. The material which was fed into the spinning extruder was dried to a content of ca. 800 ppm of water. The winding unit in octuple version with godet duo was also from the company Oerlikon Barmag and was operated with a rate of 4500 m/min.

a) Measuring Methods

The total extract contents of the untreated and extracted granules and the single extract contents of ε-caprolactam, cyclic dimer, trimer, tetramer, pentamer and hexamer of the threads produced were measured. In addition, the strain at break (RD), the tear resistance (RF) and the titer of the threads as well as their respective relative standard deviations (CV) were determined.

Determination of the Extract Contents

The determination of the single and total extract contents was conducted according to an HPLC method based on ISO 15033:2000 (E). Differently from that the samples were prepared as follows: The water-soluble monomer and oligomer components of the PA 6 sample were extracted for 8 hours with hot water which was automatically and discontinuously sucked off. The amount of the sample used was in the case of PA 6 granules after the extraction/drying 10.0 g and in the case of untreated filaments 3-5 g. This amount was placed in the extraction apparatus and was extracted with ca. 85 ml of water. After the completion of the extraction the extraction solution was transferred into a 100 ml measuring flask and the used devices were rinsed with 15 ml of water. The sample solution so obtained was then measured according to the ISO standard.

Determination of the Water Content

For the determination of the water content of the polyamide granules they were heated in a tube furnace to temperatures of up to 180° C. A dry nitrogen stream guided the expelled water to a container filled with water-free methanol in which the water content was determined quantitatively according to the method of Karl Fischer.

Titer Determination

For the determination of the titer in dtex (g per 10,000 m) or den (g per 9,000 m) from the yarn bobbins to be tested at first 500 m of yarn are unwound. Subsequently, the yarn bobbins were stored for 12 hours in a standard atmosphere with a temperature of 20±2° C. and a relative air humidity of 65±2%. Before the measurement again ca. 500 m of yarn were unwound from the bobbin and were discarded. Via a precision yarn reel with pre-loading device at a pretension of 0.05 cN/dtex or 0.05 g/den for flat yarn according to the following table yarn was unwound.

|  | Reeling length | |
| --- | --- | --- |
| Titer | Titer (dtex) | Titer (den) |
| <100 dtex (110 den) | 200 m | 180 m |
| 100 . . . 500 dtex (110 . . . 550 den) | 100 m | 90 m |
| >500 dtex (550 den) | 50 m | 45 m |

Before weighing, the ravel obtained was conditioned on a holder in standard atmosphere for 30 min. One measurement each was conducted per bobbin.

The relative standard deviation ($CV_B$) of the titer between the bobbins was calculated with the formula $$CV_B(\%) = \frac{n \cdot \sqrt{\frac{1}{n-1}\left[\sum x_i^2 - \frac{1}{n} \cdot (\sum x_i)^2\right]}}{\sum x_i} \cdot 100$$

with $CV_B$: relative standard deviation
n: number of bobbins
$x_i$: titers of the single bobbins.

For the determination at least eight bobbins each were used.

Determination of the Tensile Strength and Strain at Maximum Load

The determination of the titer-based tensile strength and the strain at maximum load was conducted on samples which have been stored for 12 hours in a standard atmosphere with a temperature of 20±2° C. and a relative air humidity of 65±2%. At first, such as described above, the titer of the yarn was determined. Subsequently, ca. 500 m of yarn were unwound and discarded.

Per yarn bobbin 20 tensile stress-strain measurements were conducted in a tensile-strength tester and the single results thereof were arithmetically averaged. The distance between the clamps was 200 mm±1 mm, the measurement speed was 2,000 mm/min and the pretension was 0.05 cN/dtex or 0.05 g/den. The titer-based tensile strength was calculated by dividing the averaged maximum load value by the determined titer.

The relative standard deviations of the tensile strength and the strain at maximum load were calculated with the use of the equation $$CV(\%) = \frac{n \cdot \sqrt{\frac{1}{n-1}\left[\sum x_i^2 - \frac{1}{n} \cdot (\sum x_i)^2\right]}}{\sum x_i} \cdot 100$$

with: CV=relative standard deviation (%)
n=number of the average values ($CV_B$)
$x_i$=average values ($CV_B$).

b) Comparison Examples 1.1 and 1.2

In the standard process the untreated starting granules were wet-extracted. The total extract content after the wet extraction was 0.21% by weight. Then, the wet-extracted PA 6 granules were spun at a spinning position into POY. During the spinning process the granules had a water content of 800 ppm. The extract content of the finished thread was in comparison example 1.1 0.77% by weight ($T_{spinneret}$=280° C.) and in comparison example 1.2 0.57% by weight ($T_{spinneret}$=268° C.).

c) Examples 2.1 and 2.2

As degasification extruder a ring extruder model RE3, 32D from the company Extricom was used. The untreated starting granules with a water content of ca. 1000 ppm were melted in an extruder and the melt was fed into the degasification extruder which was operated with a throughput of 350 kg/h at 450 rpm. The vacuum applied there was 1 mbar abs. and was generated by a pump stand with upstream sublimator and regenerative high performance metal filter. The sublimator was operated at a temperature of −20° C. The vapor from the degasification extruder, before the sublimator, was guided through a direct condenser with a circulation of ε-caprolactam being operated at 85° C. As entraining agent 0.75% by weight of water was metered into the degasification extruder. Then, the extracted melt was processed into granules. The total extract content of the granules after the vacuum extraction was in example 2.1 0.31% by weight (Thead=280° C.) and in example 2.2 0.28% by weight (Thead=269° C.).

The granules produced via vacuum extraction were subsequently spun like the comparison examples into POY and the extract values were determined. Here it has been shown that the extract values of the (simulated and more economic) direct route are absolutely comparable with the expensive wet extraction process. The extract content in the finished thread was in example 2.1 0.83% by weight ($T_{spinneret}$=282° C.) and in example 2.2 0.65% by weight ($T_{spinneret}$=271° C.). Thus, for the common products of the large-scale productions the method according to the present invention is suitable very well, with a considerably improved economic efficiency at the same time.

d) Examples 3.1 and 3.2

In the examples 3.1 and 3.2 under otherwise identical trial conditions such as in examples 2.1 and 2.2 in addition to the 0.75% by weight of water as a further entraining agent also 5% by weight of ε-caprolactam was metered into the degasification extruder.

The total extract content of the granules after the vacuum extraction was in example 3.1 0.30% by weight (Thead=281° C.) and in example 3.2 0.26% by weight (Thead=269° C.). The extract content in the finished thread was in example 3.1 0.81% by weight ($T_{spinneret}$=281° C.) and in example 3.2 0.62% by weight ($T_{spinneret}$=271° C.). In particular it can be seen that the detrimental cyclic oligomers are reduced.

In the following tables 1 and 2 the results of the measurements at the threads and the extract compositions are provided. In table 1 it can further be seen that not only the extract values which are achieved with the method according to the present invention are comparable with the wet extraction process being established in prior art, but that also the most important mechanic characteristic parameters of the yarns produced as well as their margin of fluctuations achieve the prior art level.

TABLE 1

Measuring results at the thread (DH = strain at maximum load, ZF = tensile strength, CV = relative standard deviation)

| Example | DH [%] | CV (DH) [%] | ZF [cN/dtex] | CV (ZF) [%] | CV (titer) [%] | Extract (thread) [% by weight] |
|---|---|---|---|---|---|---|
| 1.1 | 73.5 | 3.7 | 4.0 | 2.6 | 0.43 | 0.77 |
| 1.2 | 73.0 | 3.6 | 4.1 | 3.6 | 0.43 | 0.57 |
| 2.1 | 73.8 | 3.7 | 4.1 | 2.7 | 0.42 | 0.83 |
| 2.2 | 72.9 | 3.6 | 4.1 | 2.5 | 0.44 | 0.65 |
| 3.1 | 73.2 | 3.9 | 4.1 | 2.6 | 0.42 | 0.81 |
| 3.2 | 72.6 | 3.5 | 4.1 | 2.4 | 0.43 | 0.62 |

TABLE 2

| | Extract composition at the thread | | | | | | |
|---|---|---|---|---|---|---|---|
| | Extract content [% by weight] | | | | | | |
| Example | Monomer | Cyclic dimer | Trimer | Tetramer | Pentamer | Hexamer | Sum |
| Starting granules | 9.86 | 0.81 | 0.32 | 0.19 | 0.06 | 0.03 | 11.27 |
| 1.1 | 0.09 | 0.09 | 0.16 | 0.15 | 0.17 | 0.11 | 0.77 |
| 1.2 | 0.07 | 0.08 | 0.11 | 0.11 | 0.11 | 0.09 | 0.57 |
| 2.1 | 0.23 | 0.20 | 0.21 | 0.12 | 0.04 | 0.03 | 0.83 |
| 2.2 | 0.18 | 0.16 | 0.17 | 0.09 | 0.03 | 0.02 | 0.65 |
| 3.1 | 0.29 | 0.16 | 0.18 | 0.11 | 0.04 | 0.03 | 0.81 |
| 3.2 | 0.24 | 0.12 | 0.14 | 0.08 | 0.03 | 0.01 | 0.62 |

LIST OF REFERENCE SIGNS 1 degasification device
2 direct condenser
3 circulation pump
4 heat exchanger
5 sublimator
6 high performance metal filter
7 vacuum pump stand
8 untreated polyamide 6 melt
9 extracted polyamide 6 melt
10 vapor
11 liquid ε-caprolactam
12 liquid ε-caprolactam with condensed low-molecular substances
13 non-condensable constituents
14 ε-caprolactam overflow
15 VK tube
16-18 degasification apparatus
19-21 spinning site

The invention claimed is:

1. A method for the production of polyamide 6 with low extract content, comprising the steps of
   a) providing a melt of non-extracted polyamide 6;
   b) feeding the melt into a degasification device which is connected with a vacuum generation device;
   c) extracting of ε-caprolactam and oligomers from the melt in vacuum;
   d) feeding the extracted polyamide 6 melt from the degasification device into a further processing,
   wherein,
   the vacuum generation device comprises an upstream pre-separator which is cooled with coolant,
   between the degasification device and the pre-separator, a direct condenser is arranged,
   the direct condenser is operated with liquid ε-caprolactam which is circulated, wherein for maintaining a constant circulation amount continuously, an amount of ε-caprolactam which corresponds to the condensed extract amount is removed, and
   one or more entraining agents are metered and mixed into the melt in the degasification device,
   wherein the degasification device comprises
      a metering site;
      a gas feed, a solid metering or a liquid feed at the metering site;
      a mixing device for mixing an entraining agent into the melt;
   wherein at least one of the entraining agents is ε-caprolactam.

2. The method according to claim 1, wherein the further processing consists of an optional addition of additives to the melt and a) a granulation or b) a direct process of spinning into textile fibers and/or filaments, the foil extrusion or the production of molded bodies and wherein the addition of additives may also already be conducted in the degasification device.

3. The method according to claim 2, wherein the textile fibers and/or filaments being spun in a direct process contain extractable portions in amounts of ≤0.85% by weight, preferably ≤0.75% by weight, particularly preferably ≤0.65% by weight.

4. The method according to claim 2, wherein the textile fibers and/or filaments being spun in a direct process contain extractable portions in amounts of ≤0.24% by weight of monomer, ≤0.20% by weight of cyclic dimer, ≤0.21% by weight of trimer, ≤0.12% by weight of tetramer, ≤0.04% by weight of pentamer and ≤0.03% by weight of hexamer.

5. The method according to claim 2, wherein the textile fibers and/or filaments being spun in a direct process have a relative standard deviation of the strain at break of <4% and/or a relative standard deviation of the tear resistance of <3% and/or a relative standard deviation of the titer of <0.45%.

6. The method according to claim 1, wherein the entraining agent is selected from water, water vapor, nitrogen, $CO_2$ or a noble gas.

7. The method according to claim 1, wherein the degasification device consists of a multi-screw degasification aggregate or a thin film vaporizer.

8. The method according to claim 7, wherein the multi-screw degasification aggregate consists of a multi-screw extruder, an extruder with more than two screws, a ring extruder or a multi-rotation extruder.

9. The method according to claim 1, wherein after step a) and/or c), isocyanic acid, urea, biuret, cyanuric acid and/or oligomeric or polymeric homologues of urea are added to the polyamide 6 melt and mixed.

10. The method according to claim 1, wherein the pre-separator has a two-stage design consisting of a sublimator and a downstream regenerative metal filter.

11. The method according to claim 10, wherein the pre-separator is present twice and is alternately operated in the separation and cleaning mode.

* * * * *